US006308530B1

(12) United States Patent
Paul

(10) Patent No.: US 6,308,530 B1
(45) Date of Patent: Oct. 30, 2001

(54) ICE-FILLED COLD STORAGE MEANS FOR REPEATED FREEZING AND MELTING

(75) Inventor: Joachim Paul, Flensburg (DE)

(73) Assignee: Integral Energietechnik GmbH, Flensburg (DE)

( * ) Notice: Subject to any disclaimer, the term of this patent is extended or adjusted under 35 U.S.C. 154(b) by 0 days.

(21) Appl. No.: 09/700,303

(22) PCT Filed: May 10, 1999

(86) PCT No.: PCT/DE99/01405

§ 371 Date: Nov. 9, 2000

§ 102(e) Date: Nov. 9, 2000

(87) PCT Pub. No.: WO99/58912

PCT Pub. Date: Nov. 18, 1999

(30) Foreign Application Priority Data

May 11, 1998 (DE) ............................................... 298 08 895

(51) Int. Cl.⁷ ................................. F25D 17/02; F28F 7/00
(52) U.S. Cl. ............................ 62/434; 62/457.2; 62/530; 165/46
(58) Field of Search .................................. 62/434, 457.2, 62/430, 530, 379, 380; 165/46, 81, 104.21; 607/104, 114

(56) References Cited

U.S. PATENT DOCUMENTS

| 4,211,208 | 7/1980 | Lindner . |
| 5,327,746 | 7/1994 | Duh . |

FOREIGN PATENT DOCUMENTS

| 472 643 | 5/1969 | (CH) . |
| 28 19 569 A1 | 11/1979 | (DE) . |
| 30 05 450 A1 | 8/1981 | (DE) . |
| 0 118 720 | 9/1984 | (EP) . |
| 2 400 162 | 3/1979 | (FR) . |

*Primary Examiner*—Henry Bennett
*Assistant Examiner*—Chen-Wen Jiang
(74) *Attorney, Agent, or Firm*—Larson & Larson, P.A.; James E. Larson

(57) ABSTRACT

Ice-filled cold storage means for the repeated freezing and, accompanied by the cooling of air or a cooling fluid, melting of the ice, with an elastic sleeve (2) for an ice supply, which is kept by a substantially dimensionally stable jacket (3) under close heat transfer contact at the location of an air or fluid guide and which is set up for moving air to be cooled or dehumidified or a cooling fluid past the ice supply.

20 Claims, 2 Drawing Sheets

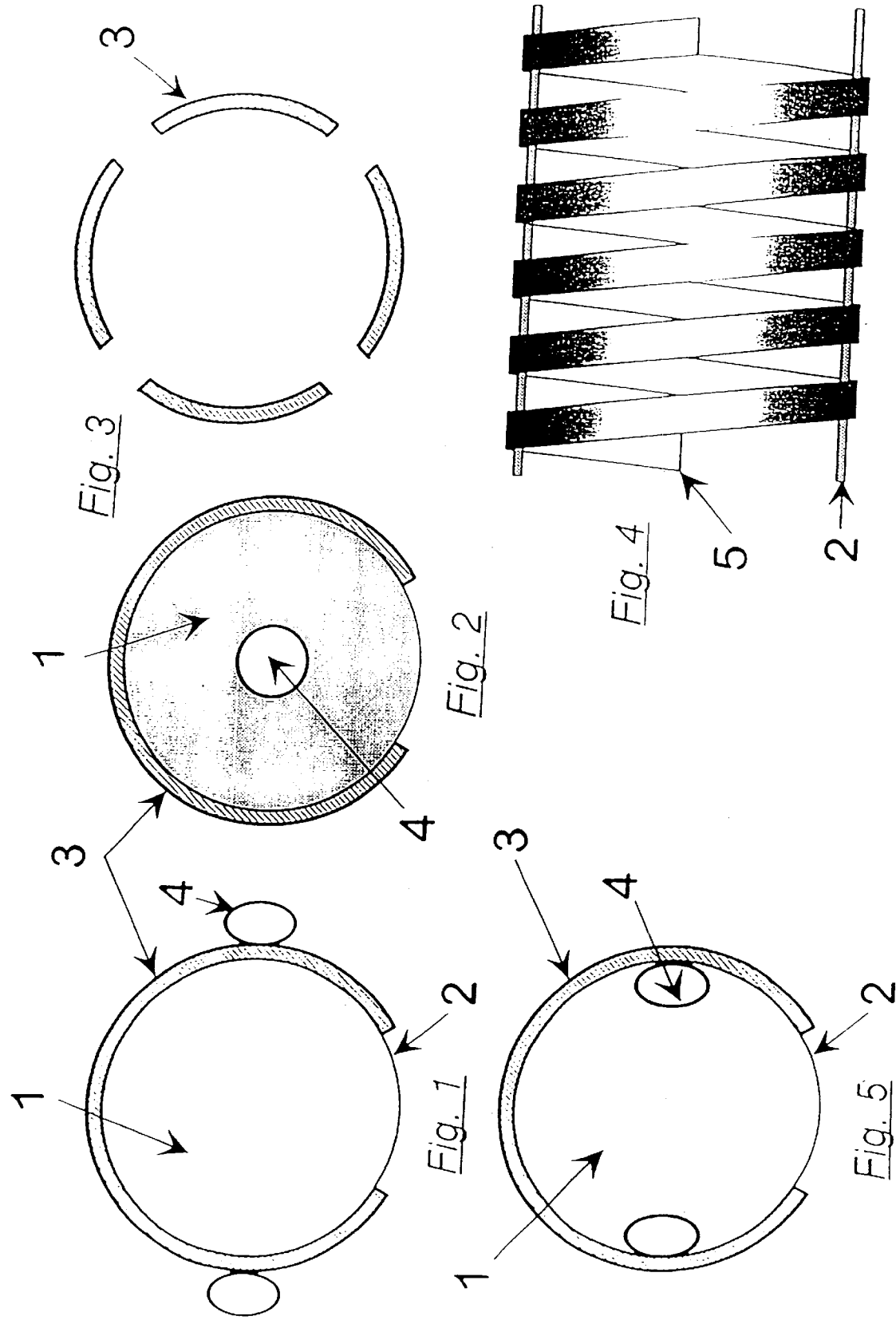

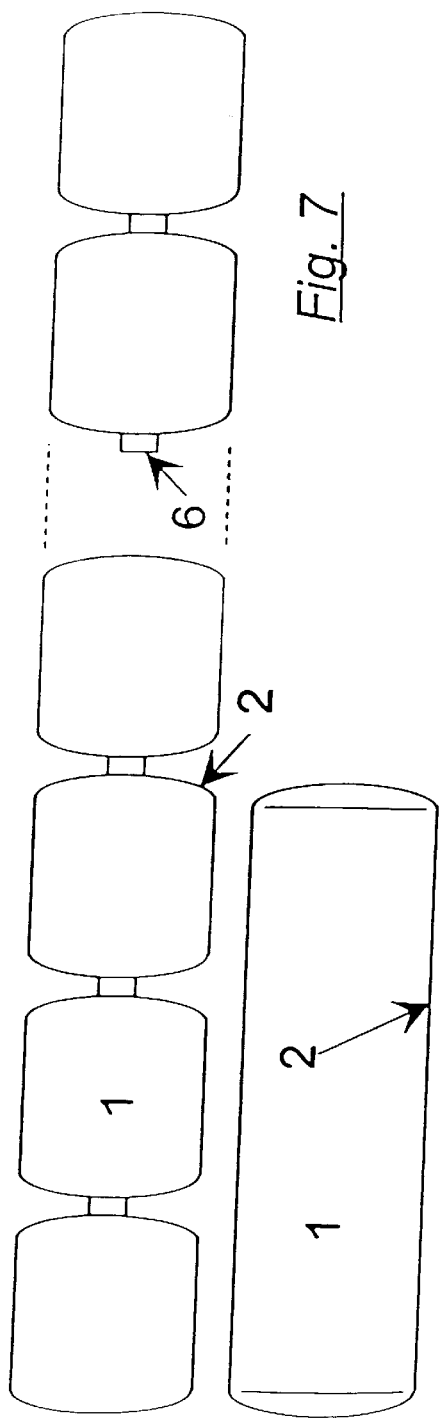
Fig. 6
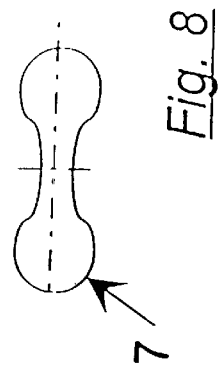
Fig. 8
Fig. 7
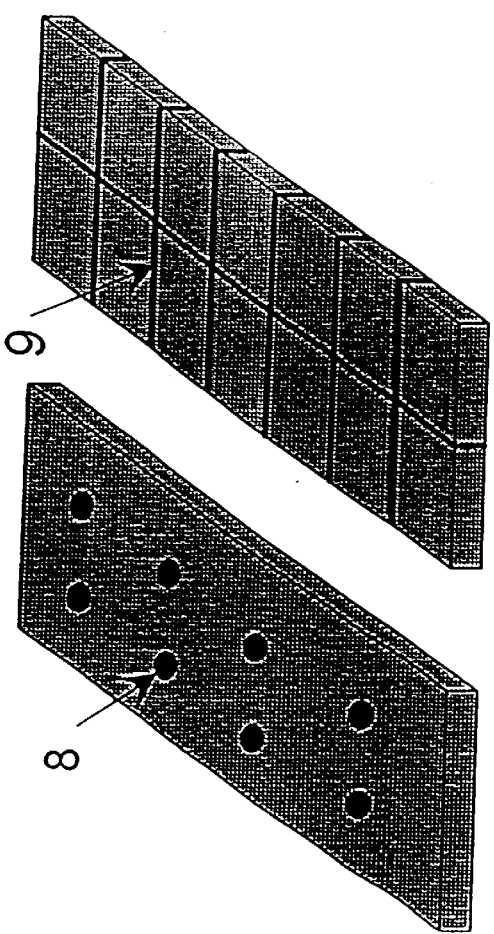
Fig. 10
Fig. 9

ICE-FILLED COLD STORAGE MEANS FOR REPEATED FREEZING AND MELTING

This application is a §371 U.S. National Phase application which bases priority on International Application No. PCT/DE99/01405, filed May 10, 1999, which in turn bases priority on German Application No. DE 298 08 895.9, filed May 11, 1998.

BACKGROUND OF THE INVENTION

1. Field of the Invention

The invention relates to a ice-filled cold storage means for repeat ed freezing and melting according to the preamble of the main claim. Cold storage means are e.g. used in refrigeration technology more particularly for vehicle cooling and air conditioning.

2. Description of the Prior Art

Vehicles are cooled and air conditioned, because in vehicles the air temperature and humidity can reach values which can impair the concentration of the vehicle driver, which can have an effect on the safety of road traffic. Another reason for air treatment is the comfort of the vehicle occupants and the requirements concerning transported goods.

Vehicles which are not in operation can normally not be cooled or air conditioned, because the cooling and air conditioning system is normally jointly supplied by the vehicle drive. Thus, particularly in the sun, such vehicles can be subject to considerable heating.

The heating effect is particularly critical if the vehicle is occupied and the engine cannot or may not be operated, so that the air conditioning and cooling system cannot function, because the drive is not available for it, which is e.g. the case with vehicles, on ferries, trucks and border crossings, in stop and go traffic or in the case of smog.

The problem of the invention is to provide for such cases a cold storage means. This makes it unnecessary to have a separate drive for cooling or air conditions systems and cooling and air conditioning can take place independently of the operation of the drive engine.

Ice is proposed for the storage means operation, particularly in the case of vehicles. Ice is produced from water or an aqueous solution or mixture (hereinafter merely referred to as water to facilitate understanding).

Among all standard single-component liquids water has both the highest specific heat capacity and the highest specific melting heat. In addition, water is inexpensive and safe. This makes water a suitable storage medium. Due to the high melting heat cold storage by ice (latent energy) is far superior to the storage of cold water (sensible energy) due to the lower volume or weight.

However, also in the ice range water has an abnormal behaviour compared with most other substances. In particular the volume rises in the case of ice formation and then decreases again on undercooling or subcooling the ice. If this volume change cannot be compensated by constructional measures (e.g. by a buffer volume), containers in which ice is produced could burst as a result of the ice pressure.

For weight and space reasons the cold storage means should also be small and light. This requires the complete freezing of the water to ice with the consequence that the volume change on freezing and melting is absorbed in an operationally safe manner.

SUMMARY OF THE INVENTION

According to the invention these limiting conditions have been satisfied by a cold storage means having the features of the main claim. The subclaims give advantageous embodiments of the invention.

The cooling system in the vehicle and which is supplied by the vehicle drive, during operation and within the scope of the available capacity takes over the cooling of the vehicle interior and/or can additionally supply the cold storage means ("charging operation"). Part or all the cooling capacity is used for ice formation (if the water of the cold storage means is heated the water is firstly cooled to the freezing point).

As a function of the regulatability of the cooling system, following freezing, the ice is further cooled ("undercooling") or the cold supply of the cold storage means is interrupted. In any case the volume of the ice has at least temporarily increased.

As soon as the cold storage means is used for air cooling purposes ("discharging operation"), a heat flow to the ice heats and/or melts the latter. The ice is again transformed into water, which is optionally still warmed. This discharging process is also associated with volume changes.

As a result of the volume changes in charging and discharging operation additional drive forces come into action due to the changed specific volumes, which in particular during discharging operation lead to the melted ice floating in the water. If the cold storage means is completely discharged during each operating cycle (the ice being completely melted), when a charging operation takes place again always the same starting conditions apply under which the ice is initially formed at the coldest point of the cold storage means. This type of charging operation is reproducible and can be constructionally comparatively easily controlled.

However, it is difficult to operate the cold storage means if the ice has not yet completely melted before the cold storage means is again supplied from the cooling system ("partial discharging"). As a result of the buoyancy forces of the ice and optionally as a result of forces from the vehicle operation ice from a partially discharged storage means can collect at points where it leads to additional problems in the case of a repeated charging operation. With energy release through the cooling or refrigerating machine, accumulated ice can locally possibly lead to an increased volume and therefore increased pressure, which is an additional burden on the container construction.

The partial discharge problem can be counteracted in that the cooling is controlled in such a way that there must always be a complete discharge before repeated freezing is allowed. However, this represents a waste of energy and is usually not possible or sensible for time reasons alone, e.g. in the case of motor vehicles.

Thus, the cold storage means of a vehicle must be "cycle-proof", i.e. all charging and discharging states, including the partial discharge, must be operationally safe over a random number of cycles.

The invention achieves the desired objective with a cold storage means having the features of the main claim, in which the container in which the ice is formed and melted is constructed elastically. Advantageously, there is in particular an elastic sleeve, which by means of an external, dimensionally stable jacket is held in fixed manner in close heat transfer contact with air or some other cooling fluid which is to be cooled and/or dehumidified. On the jacket can be provided ribs or rib segments, depressions or prongs for the purpose of increasing the heat transfer surface.

A preferred embodiment proposes a substantially cross-sectionally circular, elastic sleeve being housed in a surrounding circular, dimensionally stable jacket, in which a circular portion is in the form of a slot in order to permit a volume change to the sleeve in the case of jacket deformation.

It is also proposed that the jacket be constructed with more than one recess and for clamping members to be provided for holding together the segments. The jacket can also be formed entirely by clamping members. It is also proposed that a pipe for the cooling or refrigerating fluid supply be in heat transfer contact with the inside or outside of the jacket. With an arrangement of the cooling fluid pipe in the sleeve, said sleeve can be connected to the pipe in such a way that the sleeve is connected tightly and permanently to the pipe at its inlet and outlet (e.g. by bonding pipe and sleeve).

The sleeve can also have a cushion shape with a pocket for receiving a pipe. A cushion-like sleeve can embrace the cooling fluid pipe in such a way that said cushion is so placed around the pipe that the latter is located in "folds" of the cushion. In this case there is no need for fixing, e.g. by bonding. Through a subdivision of the sleeve into chambers smaller individual volumes are created in which ice is in each case retained. These small volumes can e.g. be represented by longitudinal and/or transverse seams of the cushion- like sleeve. The cushion-like sleeve can be subdivided into small volumes by vulcanization, welding, bonding or sewing.

It is also possible to introduce into the sleeve part of the fluid or some other fluid in the form of capsules. As a result of the heaping of the capsules a floating thereof is virtually prevented, so that there can be no pronounced floating of melting ice as a result of buoyancy. This gives a largely homogeneous structure in the sleeve.

The capsules can be filled with a freezable fluid and a specific capsule volume can remain fluid-free. It is appropriately an air volume, which is compressed on freezing the fluid an d leads to no or only a slight capsule volume rise. Thus, the high ice pressure is absorbed by a compressible gas.

A decision must e.g. be reached as to whether the capsules and the sleeve contain the same or different fluids. The fluid in the sleeve can be a substance, which at a different temperature freezes or remains liquid. The sleeve can also contain a freezing fluid, whereas the capsules contain a non-freezing fluid. This is in particular the case if the capsules contain a compressible substance (a gas, e.g. air). This gas would absorb the ice pressure of the surrounding, freezing fluid and change its volume.

Each of these possibilities has its own specific fields of use, which are in particular dependent on the geometry and desired time component of the cold storage means. The individual capsules are advantageously constructed in elastic manner so as to restore their shape, but there can also be an element, e.g. a spring in the capsules, which compensates the volume change and restores the capsule shape. Another possibility for restoring the capsule shape is a volume change-compensating gas volume in the capsules. Finally capsules having a lens and/or dumbbell shape is proposed.

Further features and advantages of the invention can be gathered from a following description of a preferred embodiment and the attached drawings, wherein show:

DESCRIPTION OF THE DRAWINGS

FIG. 1 An elastic sleeve 2 surrounded by a dimensionally stable jacket 3, the cooling fluid pipe or pipes 4 being attached externally to the sleeve 2.

FIG. 2 A representation corresponding to FIG. 1 with a cooling fluid pipe 4 placed centrally through the water to be frozen.

FIG. 3 A subdivision of the jacket into several segments.

FIG. 4 A further construction in which the jacket is formed by clamping straps 5.

FIG. 5 An elastic sleeve surrounded by a dimensionally stable jacket, the cooling fluid pipe or pipes being attached within the jacket.

FIG. 6 An elastic sleeve.

FIG. 7 An elastic sleeve as in FIG. 6, which is subdivided into smaller single volumes by "tying off" by constriction.

FIG. 8 A dumbbell-shaped capsule 7.

FIG. 9 A cushion-like, elastic sleeve, which is subdivided by punctiform connections 8 of the two surfaces.

FIG. 10 A cushion-like, elastic sleeve, which is subdivided into chambers by longitudinal and/or transverse seams 9.

DETAILED DESCRIPTION OF THE PREFERRED EMBODIMENT

In FIG. 1 an elastic sleeve 2 is surrounded by a dimensionally stable jacket 3, so that a rigid, dimensionally stable container is obtained in which the water is frozen and as ice can be melted, the volume change at typical operating temperatures being absorbed by an elastic inner layer and a slight shape change of the outer layer. As a result of the thin inner layer of sleeve 2 a heat transfer is readily possible. As a result of the extension of the sleeve 2 the full-surface, good thermal contact is further improved, because the intimacy of the connection is increased.

Heat removal takes place by cooling fluid-filled pipes 4, in which the cooling fluid is evaporated so as to in this way make available the necessary cooling capacity. These pipes 4 can be positioned externally as in FIG. 1 or internally as in FIGS. 2 and 5. The pipes 4 can be in heat transfer contact with the sleeve 2.

Preference is given to a construction in which the sleeve 2 is constructed as a "cushion", e.g. as a long sleeve 2 subdivided by longitudinal and transverse seams 9. The sleeve 2 is placed around the pipe or pipes and can then be inserted in the jacket. This avoids seams or joints between the sleeve 2 and the pipe 4, which increases operational safety and reliability.

A further construction can involve clamping straps 5 surrounding the sleeve using elastic clamping straps or, if the sleeve 2 is very elastic, solid clamping straps 5, which are not elastic and in the latter case the volume change can be absorbed in the slots between the clamping straps by expansion of the sleeve. For increasing a clearly defined geometry it is possible to introduce further rigid "inserts" in the form of rods or bars between the sleeve and the clamping straps, which define the geometry of the cold storage means.

The sleeve 2 shown in FIG. 6 and subdivided by tying off with tying off devices 6 can e.g. be formed by an elongated hose and subdivided with the aid of metal clips, strings, vulcanization, etc., so that individual chambers are formed, which reduce the effects of buoyancy of frozen ice in unfrozen water to a smaller volume and consequently "homogenize" the effects of buoyancy.

The undesired "asymmetrical freezing out" of the ice, which leads to a compaction of ice at upper locations, is consequently subdivided over smaller areas and therefore also small, absolute length changes of the ice volumes.

It is also possible to place in the sleeve part of the fluid or some other fluid in the form of fluid-filled capsules 7. FIG. 10 is an example of a dumbbell-shaped capsule, but obviously spherical or lenticular capsules are also possible.

However, as a result of the dumbbell-shaped capsule 7 a particularly large surface area is obtained, which leaves sufficient elasticity in the capsule wall to compensate volume changes.

It is proposed that the capsules also be filled with a freezable fluid and a specific capsule volume remains fluid-free. It is appropriately an air volume, which is compressed on freezing the fluid and only allows the capsule volume to rise slightly or not at all. Thus, the high ice pressure is absorbed by a compressible gas, e.g. air.

Usable freezing point-reducing substances are organic salts such as acetate, formate, propionate, as well as glycol, sugar, fructose, ammonia, potash or a potash compound, glycerol, calcium chloride, magnesium chloride, common salt, ethanol, isopropanol or methanol.

For the particular application it is left to individual choice whether the same or different fluids are used in the capsules and sleeve. The fluid in the sleeve can be a substance, which either freezes at another temperature or is intended to remain liquid.

The sleeve can also contain a freezing fluid, whereas the capsules contain a non-freezing fluid. This is particularly the case if the capsules contain a compressible substance, e.g. a gas such as air. This gas absorbs the ice pressure of the surrounding freezing fluid and changes the volume thereof.

As the capsules are intended to reassume their original shape following a volume change, it is appropriate to construct the capsules in such a way that there can be no permanent deformation. This risk more particularly exists with spherical capsules, which can be "dented" by an external pressure acting on all sides and consequently may not reassume their original shape. Thus, a lenticular or dumbbell-shaped capsule design is more appropriate. It is unimportant whether use is made of a freezing liquid (expansion) or a non-freezing liquid.

In order to increase the resiliency of the capsules, it is also possible to introduce into the capsules small springs (expanding springs, helical springs, etc.) or a compressible material, e.g. foam, rubber, etc. or to introduce same together with the fluid and optionally a gas cushion. Lenticular capsules are particularly suitable for this purpose.

It is finally also proposed that the sleeves 2 in cushion form be given larger dimensions and the cushions surround the cooling fluid pipe. Such sleeves divided in mat-like manner into small "partial cushions" can either be segmented by punctiform connections or provided with net-like structures in the interior in order to prevent floating of the ice.

It is also possible to "sew" in fixed manner into a sleeve an extension volume, e.g. in the form of a gas or air-filled body or a compressible material, e.g. foam rubber. However, it must be borne in mind that floating ice must not vary the orientation of the extension member and that also in the case of repeated partial discharging the resiliency of said expansion volume must be sufficiently high in order to in each case restore the original volume.

Having thus described the invention, what is claimed and desired to be secured by Letters Patent is:

1. A cooling apparatus for conditioning air within an area of a vehicle, the air within the vehicle area capable of being substantially isolated from surrounding ambient air, the cooling apparatus capable of retaining a fluid in a melted liquid state or frozen solid state, the cooling apparatus comprising:
   a) a closed container for retaining the fluid, the container comprising an outer elastic sleeve and an internal volume, the elastic sleeve permitting the container to expand, or contract in response to fluctuations in the container internal volume;
   b) a jacket member inserted around the elastic sleeve for stabilizing the container in a generally fixed position, the jacket member having an inner and outer surface;
   c) means for manipulating the temperature of the container fluid, the means in thermal contact with the fluid; and
   d) means for reducing expansion of the container elastic sleeve when the container fluid is in the frozen solid state, the means inserted within the container.

2. The cooling apparatus of claim 1, wherein the jacket member has a plurality of ribs formed along the outer surface for increasing heat transfer properties of the jacket member.

3. The cooling apparatus of claim 1, wherein the jacket member is circular and has a slot formed therein permitting the jacket member to deform as the elastic sleeve expands or contracts in response to fluctuations in the container internal volume.

4. The cooling apparatus of claim 1, wherein the jacket member comprises a plurality of segments surrounding the elastic sleeve, each segment attached to an adjacent segment by a clamp.

5. The cooling apparatus of claim 4, wherein a small gap is provided between each adjacent jacket member segment.

6. The cooling apparatus of claim 1, wherein the means for manipulating the temperature of the container fluid comprises at least one pipe capable of carrying fluid or a gas.

7. The cooling apparatus of claim 6, wherein a pair of pipes are employed.

8. The cooling apparatus of claim 7, wherein one of each of the pair of pipes are attached juxtaposed in thermal contact to the jacket member outer surface at opposed sides.

9. The cooling apparatus of claim 7, wherein one of each of the pair of pipes are attached juxtaposed in thermal contact to an inner surface of the elastic sleeve at opposed sides within the container.

10. The cooling apparatus of claim 7, wherein a single pipe is employed within the container along a center axis thereof.

11. The cooling apparatus of claim 1, wherein the elastic sleeve comprises a cushion-shaped member having at least one pocket formed therein for receiving the means for manipulating the temperature of the container fluid.

12. The cooling apparatus of claim 1, wherein the elastic sleeve comprises a cushion-shaped member having a plurality of sections formed by a plurality of transversely disposed seams.

13. The cooling apparatus of claim 1, wherein the container comprises a plurality of chambers, each chamber comprising a portion of a total of the container internal volume.

14. The cooling apparatus of claim 1, wherein the means for reducing expansion of the container elastic sleeve when the container fluid is in the frozen solid state is at least one capsule having a closed outer surface and an internal cavity, the at least one capsule disposed within the container fluid.

15. The cooling apparatus of claim 14, wherein the at least one capsule contains fluid within the capsule internal cavity, the fluid within the capsule internal cavity having a freezing point threshold below that of the container fluid.

16. The cooling apparatus of claim 14, wherein the at least one capsule contains a gas within the capsule internal cavity.

17. The cooling apparatus of claim 14, wherein the at least one capsule comprises a spring inserted within the internal cavity permitting the capsule to return to a relaxed state after being deformed in a depressed state.

18. The cooling apparatus of claim 14, wherein the at least one capsule is dumbbell-shaped.

19. The cooling apparatus of claim 1, wherein the container fluid is water.

20. A cooling apparatus for conditioning air within an area of a vehicle, the air within the vehicle area capable of being substantially isolated from surrounding ambient air, the cooling apparatus capable of retaining a fluid in a melted liquid state or frozen solid state, the cooling apparatus comprising:

a) a closed container for retaining the fluid, the container comprising an elastic outer sleeve and an internal volume, the elastic sleeve permitting the container to expand or contract in response to fluctuations in the container internal volume;

b) a jacket member inserted around the elastic sleeve for stabilizing the container in a generally fixed position, the jacket member having an inner and outer surface;

c) at least one pipe capable of carrying a gas or fluid for manipulating the temperature of the container fluid, the at least one pipe in thermal contact with the fluid; and d) at least one capsule having a closed outer surface and an internal cavity, the at least one capsule disposed within the container fluid and capable of deforming in response to the container fluid changing from a melted liquid state to a frozen solid state.

* * * * *